United States Patent [19]

Mochizuki

[11] Patent Number: 4,512,316
[45] Date of Patent: Apr. 23, 1985

[54] FUEL INJECTION SYSTEM FOR AN INTERNAL COMBUSTION ENGINE

[75] Inventor: Kenji Mochizuki, Mitakashi, Japan

[73] Assignee: Fuji Jukogyo Kabushiki Kaisha, Tokyo, Japan

[21] Appl. No.: 538,467

[22] Filed: Oct. 3, 1983

[30] Foreign Application Priority Data

Oct. 1, 1982 [JP] Japan .................. 57-173630

[51] Int. Cl.³ .................. F02M 51/00; F02B 3/00
[52] U.S. Cl. .................. 123/478; 123/486; 123/480; 123/472
[58] Field of Search ............ 123/478, 486, 480, 472

[56] References Cited

U.S. PATENT DOCUMENTS

| | | | |
|---|---|---|---|
| 4,213,425 | 7/1980 | Read | 123/478 |
| 4,367,716 | 1/1983 | Yasuhara | 123/478 |
| 4,379,332 | 4/1983 | Busser et al. | 123/486 |
| 4,387,429 | 6/1983 | Yamauchi et al. | 123/478 |

*Primary Examiner*—Raymond A. Nelli
*Attorney, Agent, or Firm*—Martin A. Farber

[57] ABSTRACT

A fuel injection system for an internal combustion engine having intake valves, a plurality of fuel injection valves, and a control unit for determining the fuel injection time and fuel injection duration. The system comprises an ignition pulse generating circuit and computing circuit for producing a fuel injection time delay signal, representing a delay after ignition time, and a circuit for decreasing the time delay with an increase of the engine speed. A maximum time delay is selected to inject fuel after the intake valves of the engine have closed.

14 Claims, 5 Drawing Figures

FUEL INJECTION SYSTEM FOR AN INTERNAL COMBUSTION ENGINE

BACKGROUND OF THE INVENTION

The present invention relates to a fuel injection system for an internal combustion engine, and more particularly to a multi-injection system.

In the multi-injection system, a fuel injection valve is provided adjacent to an intake valve of each cylinder. In a conventional four-cycle four-cylinder engine, fuel is injected from all injection valves at every other ignition time, in other words fuel is injected once per revolution of the crankshaft of the engine at the ignition time for one of the cylinders.

FIG. 4 shows a time chart of fuel injection timing of a conventional multi-injection system for an engine (but not the curves labeled FUEL INJECTION I and II).

In the system fuel is injected at ignition time a for a number 1 cylinder and at ignition time b for a number 2 cylinder. Considering the fuel injection for the numbers 1 and 3 cylinders, the fuel injection at the ignition time a takes place immediately before the end of the intake stroke of the number 3 cylinder. It is also the same for the number 2 and 4 cylinders.

Generally, a part of the air fuel mixture induced into the cylinder during the intake stroke flows back to the common intake manifold at the end of the stroke. Therefore, a part of the fuel injected into the number 3 cylinder at the ignition time a is carried back by the returning air to the intake valve of the number 1 cylinder through the intake manifold and added to the fuel injected from the injection valve for the number 1 cylinder. Therefore, a comparatively large amount of fuel is stored in the space above the intake valve of the number 1 cylinder and that fuel is induced into the number 1 cylinder during the intake stroke of the cylinder. Accordingly, fuel is unequally distributed to the cylinders.

A fuel injection system has been proposed which operates to delay fuel injection at a time after the induced air has flown back so as to uniformly distribute the fuel to all cylinders of an engine. However, the amount of returning fuel decreases with an increase in engine speed. Further, it is difficult to control the delay time at high engine speed, since the period between fuel injection times becomes shorter.

SUMMARY OF THE INVENTION

The object of the present invention is to provide a fuel injection system in which the fuel injection time delay decreases with an increase of the engine speed.

According to the present invention there is provided a fuel injection system for an internal combusion engine having intake valves, a plurality of fuel injection valves, and a control unit for deciding fuel injection time and fuel injection duration, comprising means for detecting engine speed, computing means for producing a fuel injection time delay signal representing a delay after ignition time means for decreasing the time delay with increase of the engine speed, a maximum time delay being selected to inject fuel after intake valves of the engine have closed, whereby said fuel injection valve is opened by the fuel injection signal the control unit for injecting fuel.

DETAILED DESCRIPTION OF THE PREFERRED EMBODIMENT

Figure 1:
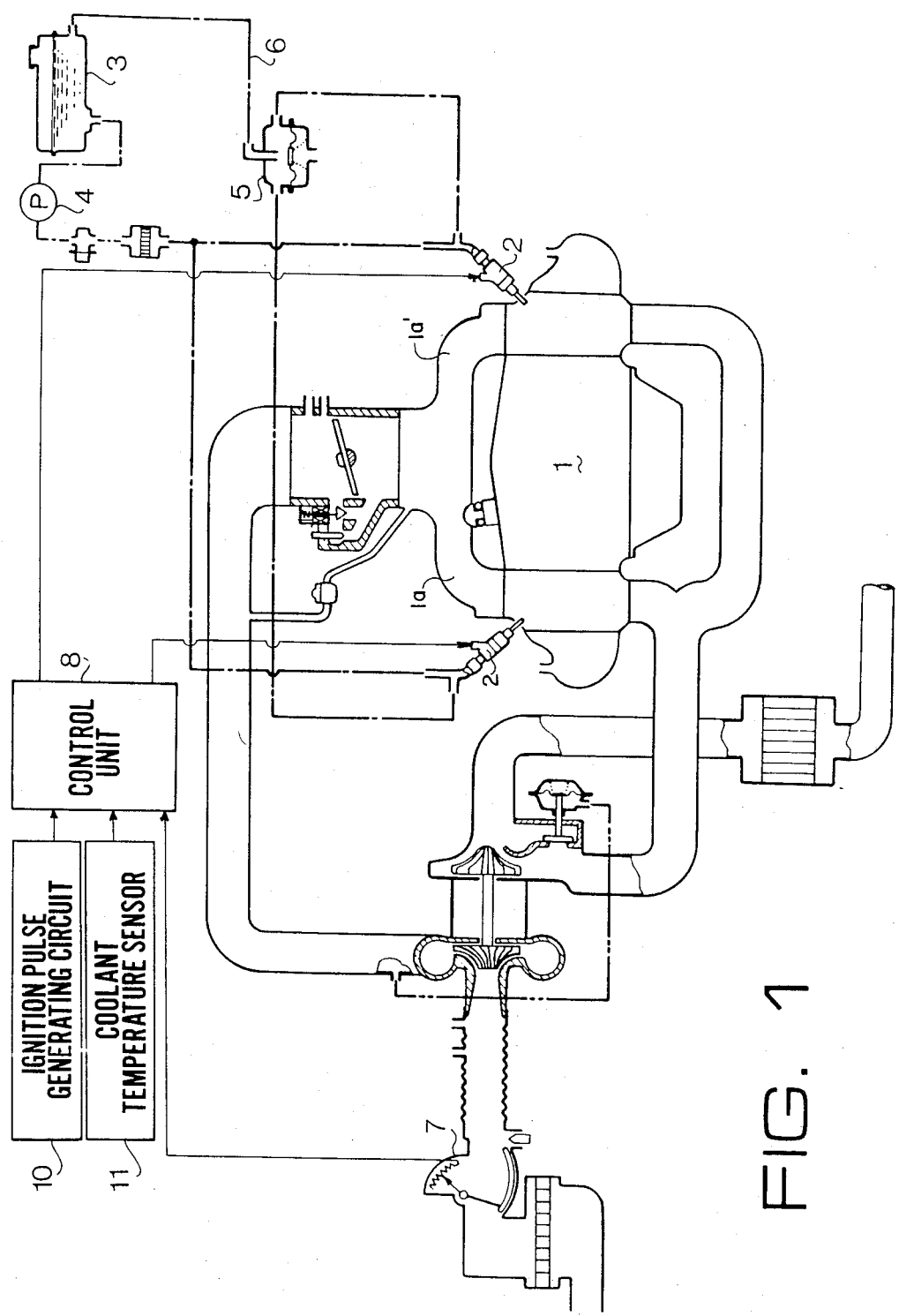
FIG. 1 is a schematic view showing an embodiment of the present invention.

Referring to FIG. 1, an engine 1 is an opposed-four-cylinder type engine, number 1 and 3 cylinders (not shown) of the engine communicating with each other by common intake manfold 1a and number 2 and 4 cylinders (not shown) communicating with each other by common intake manifold 1a'. Four fuel injection valves 2 are provided on each branch of the intake manifolds for every cylinder respectively. Each fuel injection valve 2 supplies fuel to the associated cylinder from a fuel tank 3 by a fuel pump 4 and surplus fuel returns to the fuel tank 3 through a pressure regulator 5 and a conduit 6. Opening and closing of the fuel injection valve 2 are controlled by a control signal from a control unit 8. The control unit 8 is applied with signals from an ignition pulse generating circuit 10, an air flow meter 7, and a coolant temperature sensor 11 in order to control the fuel injection.

Figure 2:
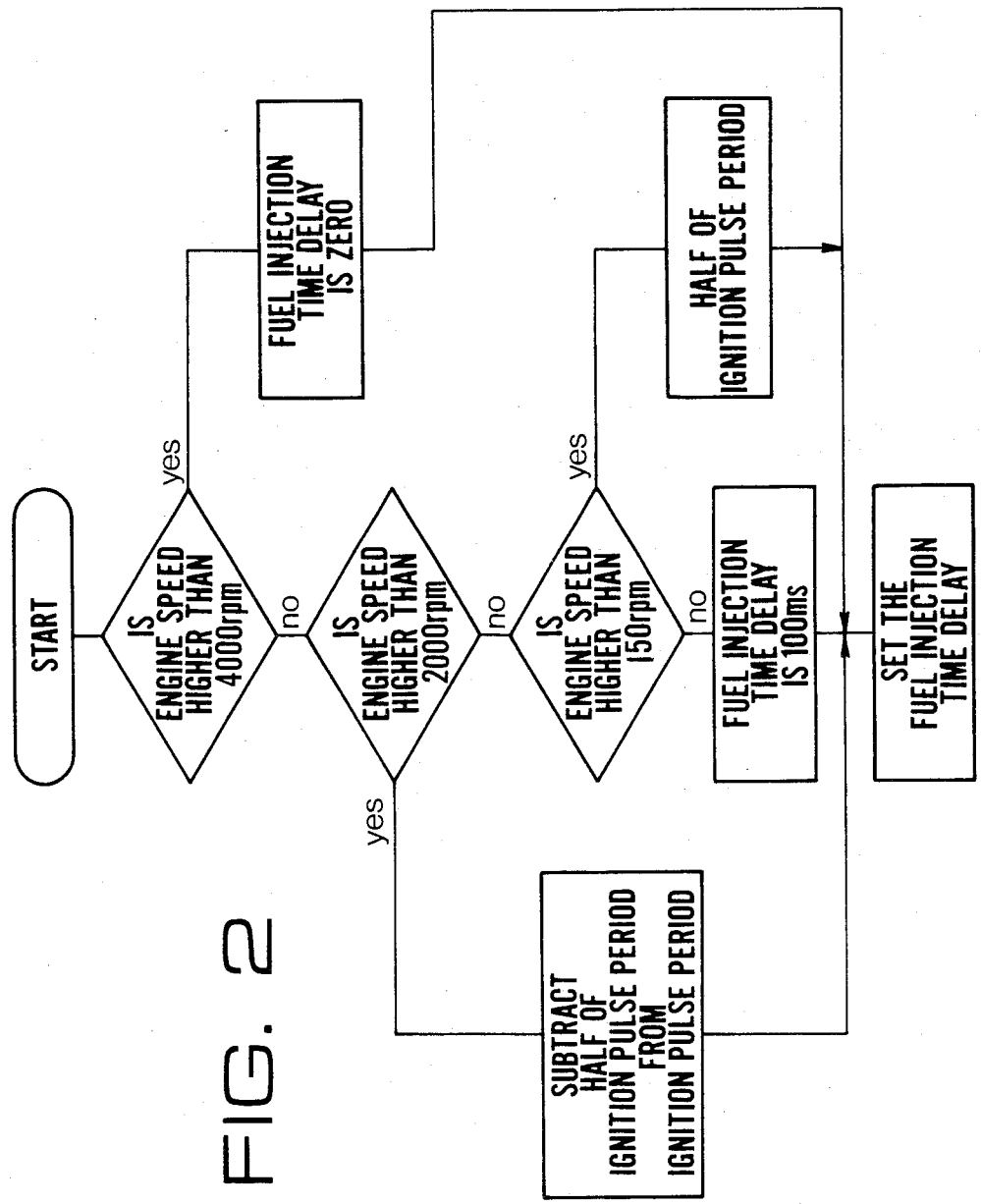
FIG. 2 is a flow chart showing a relationship between fuel injection timing and engine speed.

In accordance with the present invention, as shown in FIG. 2, the fuel injection time delay basis is changed at three steps during increasing engine speed.

Figure 3:
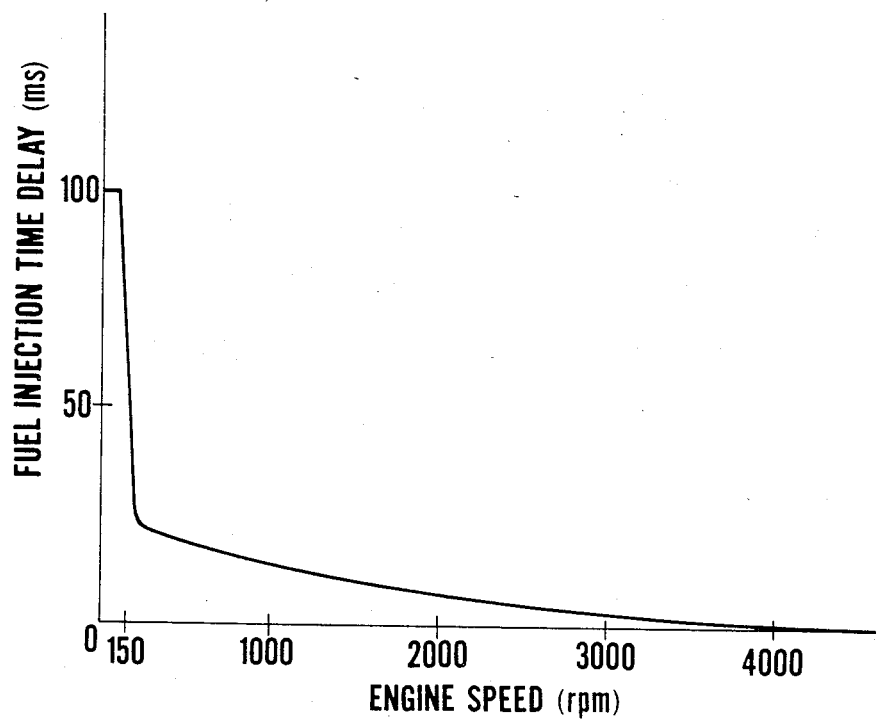
FIG. 3 is a graph showing the relationship between engine speed and fuel injection time delay.

When the engine speed is lower than 150 rpm at cranking of the engine (the lowest "decision" stage, in FIG. 2), fuel injection time (ITD) is delayed by 100 ms after ignition times a and b, (FIG. 4), respectively. Fuel injection time delay between 150–2000 rpm is half of the period of the ignition pulses in one revolution of the crankshaft of the engine, that is the period of the ignition pulse pulses being for example the period between ignition times a and c in FIG. 4. Between 2000–4000 rpm, fuel injection time delay is the time obtained by subtracting half of the ignition pulse period at 4000 rpm from the ignition pulse period at the engine speed. Over 4000 rpm, fuel injection time delay is zero, that is fuel is injected simultaneously with ignition times a and b (curve II). Thus, fuel injection time delay decreases with increasing engine speed as shown in FIG. 3.

Figure 4:
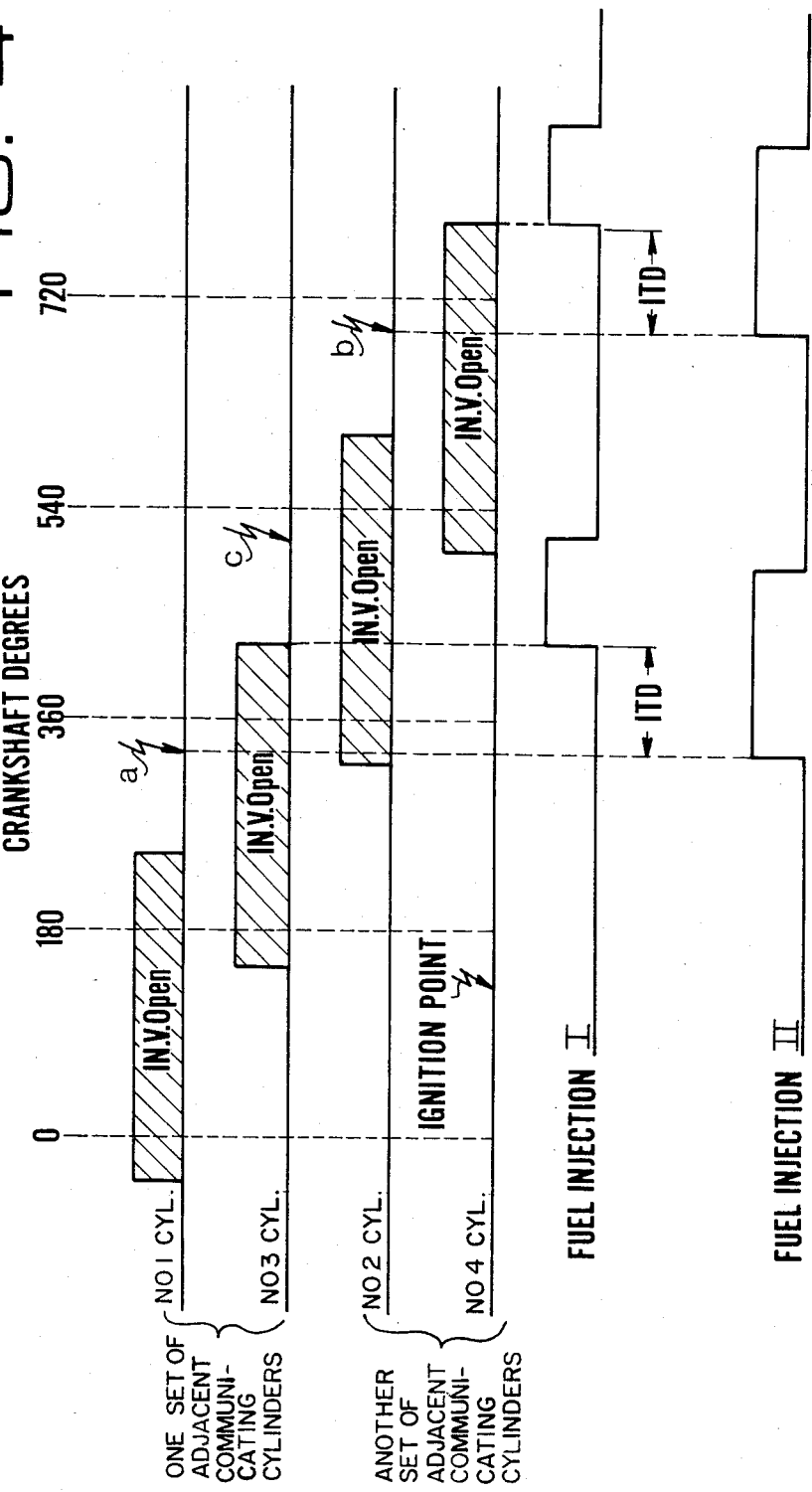
FIG. 4 is a time chart showing fuel injection time in a system according to the present invention.

At a low engine speed, fuel is injected after the intake valve of the subsequently ignited cylinder has been closed as shown by a waveform I in FIG. 4, and at a high speed over 4000 rpm, fuel is injected without delay as shown by a waveform II. Thus, returning of injected fuel at low engine speed can be prevented.

Figure 5:
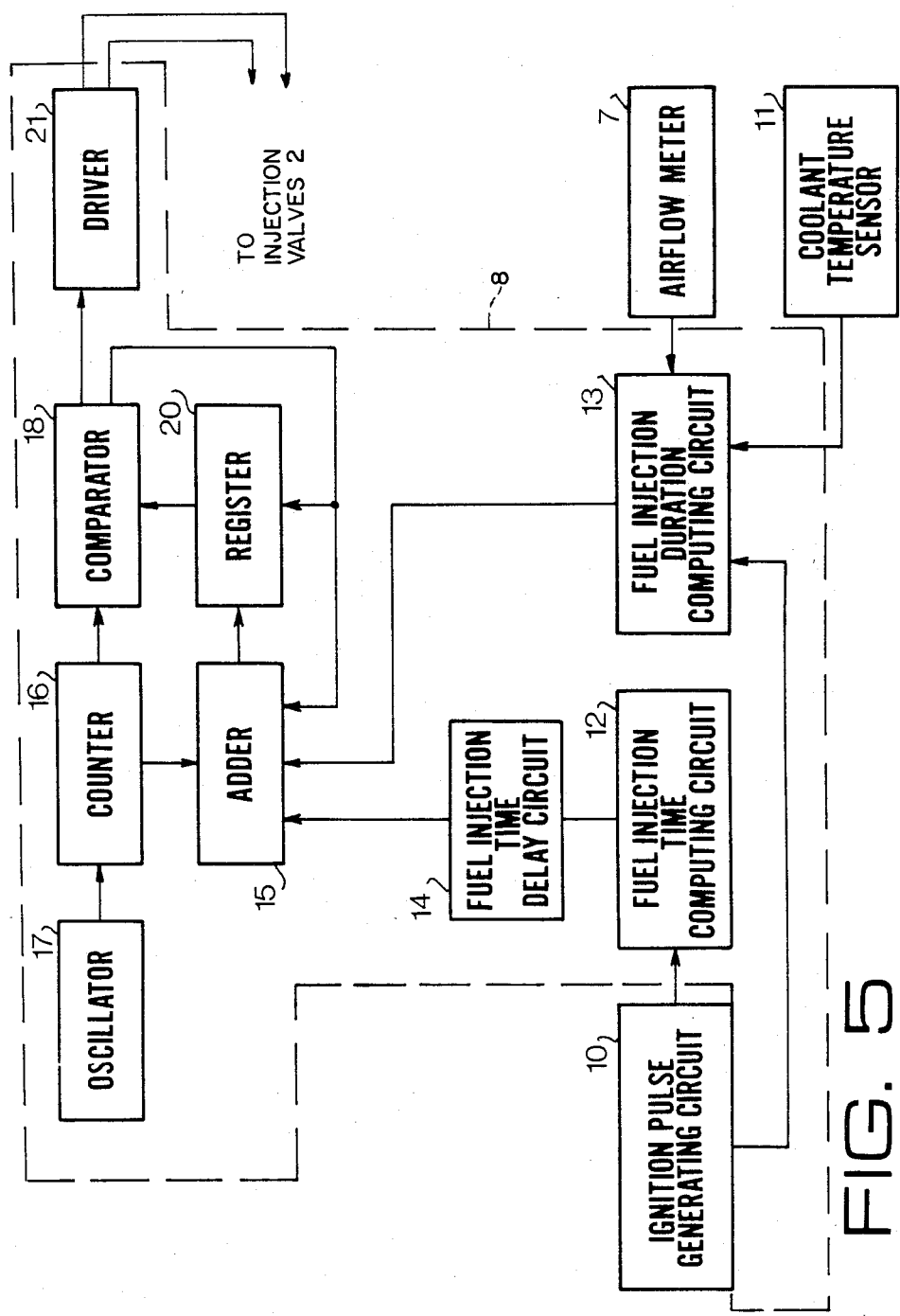
FIG. 5 is a block diagram showing a system of the present invention.

Explaining the operation of the system with reference to FIG. 5, ignition pulses are supplied from the ignition pulse generating circuit 10 to a fuel injection time computing circuit 12 and to a fuel injection duration computing circuit 13.

The output signal from the computing circuit 12, which represents the fuel injection timing at the engine speed at that time, is supplied to a fuel injection time delay circuit 14. The circuit 14 produces a delay signal with reference to a data map for the fuel injection time delay associated with the engine speed, or by computing an injection time delay using the output of the computing circuit 12. The delay signal is applied to an adder 15. On the other hand, a counter 16 counts pulses from an oscillator 17, and the output of the counter 16 is applied to the adder 15 and to a comparator 18. At the adder 15, the outputs of the fuel injection time delay circuit 14 and the counter 16 are added and an output thereof is set in a register 20. Thus, a word including a fuel injection time delay and the time when the word is set are set in the register 20. When the delay time set in the register 20 coincides with the output of the counter 16, the comparator 18 produces a fuel injection signal and a reset signal. The fuel injection signal is fed to a driver 21, the output of which is applied to the fuel injection valves 2 to inject the fuel.

On the other hand, the reset signal is applied to the adder 15 to reset it, and the fuel injection duration computing circuit 13 computes the fuel injection duration using signals applied from the ignition pulse generating circuit 10, the air flow meter 7, and the coolant temperature sensor 11. The output of the computing circuit 13 is added to the output of the counter 16 at the adder 15 and the output thereof is set in the register 20. When the set time in the register 20 coincides with the output of the counter 16, the comparator 18 produces a close signal. The close signal is applied to the driver 21 to close the fuel injection valves 2. Thus, a proper amount of fuel is injected at a proper time. The close signal is fed to the adder 15 to reset it and the above-described operation is repeated.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A fuel injection system for an internal combustion engine, wherein
    the engine having adjacent cylinders provided with intake valves, the adjacent cylinders and the intake valves undergoing a periodic operation cycle dependent on engine speed with timewise partially overlapping opening times of said intake valves, the fuel injection system comprising
    a common intake manifold communicating the adjacent cylinders with each other,
    respective fuel injection valves for said cylinders respectively disposed in said common intake manifold,
    control means for producing a fuel injection signal once each operation cycle of the communicating adjacent cylinders for simultaneously opening the fuel injection valves for the communicating adjacent cylinders,
    means for detecting the engine speed and for producing a first signal dependent thereon, and
    said control means including:
    means comprising a fuel injection time computing circuit responsive to said first signal of said detecting means for producing a second signal, and
    computing means responsive to said second signal for producing a fuel injection time delay signal providing a time delay of said fuel injection signal after ignition time of a first of the communicating adjacent cylinders, and
    said control means for decreasing the time delay with increase of the engine speed, and for providing said time delay during low engine speed below a predetermined engine speed so as to inject fuel after all of said intake valves of the communicating adjacent cylinders have closed and for making said time delay zero during high engine speed at least equal to said predetermined engine speed so as to inject the fuel at said ignition time of the first of the communicating adjacent cylinders.

2. The fuel injection system for an internal combustion engine according to claim 1, further comprising
    two separate sets of the communicating adjacent cylinders, each of said sets being spaced apart from each other on opposite sides of the engine.

3. The fuel injection system for an internal combustion engine according to claim 2, wherein
    said engine is an opposed four-cycle four cylinder engine with each of said sets containing two adjacent of said cylinders.

4. The fuel injection system for an internal combustion engine according to claim 1, wherein
    said control means for providing said time delay during said low engine speed with
    a constant first time delay for engine speeds below a lowest predetermined engine speed, and
    at least one second time delay for engine speeds between said first-mentioned predetermined engine speed and said lowest predetermined engine speed.

5. The fuel injection system for an internal combustion engine according to claim 4, wherein the engine has a crankshaft operatively connected to said intake valves a crankshaft, and wherein
    said second time delay decreases as a function of engine speed and of ignition pulse period each revolution of the crankshaft of the engine, the ignition pulse period being defined as the period between ignition times of said adjacent communicating cylinders.

6. The fuel injection system for an internal combustion engine according to claim 5, wherein
    said function of ignition pulse period is
    one-half of the ignition pulse period in a lower first range of engine speeds between said first-mentioned predetermined engine speed and said lowest predetermined engine speed, and
    the ignition pulse period minus one-half of the ignition pulse period at said first-mentioned predetermined engine speed at a higher second range of engine speeds between said first-mentioned predetermined engine speed and said lowest predetermined engine speed.

7. The fuel injection system for an internal combustion engine according to claim 4, wherein
    said first-mentioned predetermined engine speed is substantially 4000 rpm and said lowest predetermined engine speed is substantially 150 rpm.

8. The fuel injection system for an internal combustion engine according to claim 6, wherein
    said first-mentioned predetermined engine speed is substantially 4000 rpm and said lowest predetermined engine speed is substantially 150 rpm.

9. The fuel injection system for an internal combustion engine according to claim 8, wherein
    said lower first range is between substantially 150 and 2000 rpm, and said higher second range is substantially between 2000 and 4000 rpm.

10. The fuel injection system for an internal combustion engine according to claim 3, wherein
said control means for providing said time delay during said low engine speed with
a constant first time delay for engine speeds below a lowest predetermined engine speed, and
at least one second time delay for engine speeds between said first-mentioned predetermined engine speed and said lowest predetermined engine speed, said constant time delay is substantially 100 milliseconds.

11. The fuel injection system for an internal combustion engine according to claim 1, wherein
the ignition time of said first of the communicating adjacent cylinders occurs during the intake valve opening time of a second of the adjacent cylinders.

12. The fuel injection system for an internal combustion engine according to claim 2, wherein
said control means includes,
an oscillator providing oscillator pulses,
a counting means for counting said oscillator pulses,
an adder means connected to said counting means and to said computing means, the latter comprising a fuel injection time delay circuit,
a register connected to the output of said adder means,
a comparator means having inputs connected to said counting means and to said register,
a driver connected to said injection valves of the adjacent communicating cylinders and to an output of said comparator means,
said comparator means has a reset output connected to said register and to said adder means.

13. The fuel injection system for an internal combustion engine according to claim 12, wherein
said control means further comprising a fuel injection duration computing circuit connected to said detecting means and to said adder means,
an air flow meter and a coolant temperature sensor being connected to said fuel injection duration computing circuit,
said comparator means upon supplying a fuel injection signal and providing a reset signal to reset, said adder means and said register so that the fuel injection duration computing circuit is enabled via said adder means and said register to provide a time duration for the fuel injection signal.

14. A fuel injection system for an internal combustion engine, wherein
the engine having adjacent cylinders provided with intake valve, the adjacent cylinders and the intake valves undergoing a periodic operation cycle dependent on engine speed, comprising
a common intake manifold communicating the adjacent cylinders with each other,
respective fuel injection valves for said cylinders respectively disposed in said common intake manifold,
control means for producing a fuel injection signal once each operation cycle of the communicating adjacent cylinders for simultaneously opening the fuel injection valves for the communicating adjacent cylinders,
means for detecting the engine speed connected to said control means, and
said control means for producing a fuel injection time delay signal providing a time delay of said fuel injection signal after ignition time of a first of the communicating adjacent cylinders, and
said control means for providing said time delay during low engine speed below a predetermined engine speed so as to inject fuel after all of said intake valves of the communicating adjacent cylinders have closed and for making said time delay zero during high engine speed at least equal to said predetermined engine speed so as to inject the fuel at said ignition time of the first of the communicating adjacent cylinders.

* * * * *